US010077780B2

United States Patent
Tsai

(10) Patent No.: US 10,077,780 B2
(45) Date of Patent: Sep. 18, 2018

(54) METHOD FOR CONTROLLING FAN SPEED OF ELECTRONIC APPARATUS AND ELECTRONIC APPARATUS USING THE SAME

(71) Applicant: FSP TECHNOLOGY INC., Taoyuan County (TW)

(72) Inventor: Chien-Li Tsai, Taoyuan County (TW)

(73) Assignee: FSP TECHNOLOGY INC., Taoyuan (TW)

( * ) Notice: Subject to any disclaimer, the term of this patent is extended or adjusted under 35 U.S.C. 154(b) by 577 days.

(21) Appl. No.: 14/561,152

(22) Filed: Dec. 4, 2014

(65) Prior Publication Data

US 2015/0176589 A1 Jun. 25, 2015

(30) Foreign Application Priority Data

Dec. 19, 2013 (TW) .............................. 102147212 A

(51) Int. Cl.
  *F04D 27/00* (2006.01)
(52) U.S. Cl.
  CPC ................. *F04D 27/004* (2013.01)

(58) Field of Classification Search
  CPC ... F04D 27/004; F04D 27/006; G05D 7/0635; G05D 7/06; H05K 7/10736; H02P 7/2885
  USPC ........... 361/95; 700/275, 277, 304, 278, 282
  See application file for complete search history.

(56) References Cited

U.S. PATENT DOCUMENTS

| 5,029,040 A | * | 7/1991 | Ito | ........................ | H02H 7/0844 318/59 |
| 5,761,085 A | * | 6/1998 | Giorgio | ................... | G06F 1/206 361/679.4 |
| 2013/0129480 A1 | * | 5/2013 | Hirata | ................... | F04B 39/066 415/116 |

* cited by examiner

*Primary Examiner* — Philip Stimpert
(74) *Attorney, Agent, or Firm* — JCIPRNET

(57) ABSTRACT

A method for controlling a fan speed of an electronic apparatus and the electronic apparatus using the same are provided. The method includes: detecting an input voltage, an output current, and a working temperature of the electronic apparatus; calculating a target speed of the fan according to the input voltage, the output current, and the working temperature; providing a speed control signal indicating the target speed to drive the fan and obtaining a fan speed signal indicating an actual speed of the fan; and performing a close-loop control based on the fan speed signal, so that the actual speed is adjusted to the target speed.

13 Claims, 5 Drawing Sheets

METHOD FOR CONTROLLING FAN SPEED OF ELECTRONIC APPARATUS AND ELECTRONIC APPARATUS USING THE SAME

CROSS-REFERENCE TO RELATED APPLICATION

This application claims the priority benefit of Taiwan application serial no. 102147212, filed on Dec. 19, 2013. The entirety of the above-mentioned patent application is hereby incorporated by reference herein and made a part of this specification.

BACKGROUND OF THE INVENTION

Field of the Invention

The invention relates to a fan speed controlling method and an application thereof, and more particularly relates to a fan speed controlling method for adjusting a fan speed by predicting a temperature variation trend of an electronic apparatus and the electronic apparatus using the fan speed controlling method.

Description of Related Art

Internal parts (e.g. CPU) and/or devices (e.g. power supply) in an electronic apparatus are usually provided with heat sink devices (e.g. heat sinks and fans). Among these heat sink devices, the fan is an indispensable component because it is capable of dissipating heat generated by the internal parts and/or devices in the electronic apparatus to the outside of the housing of the electronic apparatus for the system of the electronic apparatus to operate normally.

Generally, the speed control signal provided for driving the fan may be a DC voltage or a pulse width modulation (PWM) signal. The fan speed (RPM) can be controlled by changing the level of the DC voltage or the duty cycle of the PWM signal.

However, even with the same speed control signal, an error in the fan speed may occur due to different fan specifications and/or wear (ageing) of the fan (the error may be up to hundreds or even thousands of revolutions). If there is a large error in the fan speed, the fan may not be able to effectively dissipate heat outside the housing of the electronic apparatus. As a result, the electronic apparatus may not function properly, which may very likely cause shutdown or unrecoverable damage to the hardware of the electronic apparatus.

In addition, according to the conventional fan speed controlling method, generally the fan speed is adjusted only based on the temperature inside the electronic apparatus. That is, the fan speed is increased only when the internal temperature of the electronic apparatus rises. With such a control mechanism, the internal temperature of the electronic apparatus may have become too high, or the circuits/devices inside the electronic apparatus may have been damaged due to high temperature when the temperature change is detected. It would be too late to increase the fan speed to maintain the normal operation of the electronic apparatus.

SUMMARY OF THE INVENTION

The invention provides a fan speed controlling method for controlling a fan speed of an electronic apparatus and the electronic apparatus using the method, which are capable of improving the accuracy of fan speed control and increasing the fan speed beforehand to enhance heat dissipation efficiency before a temperature of the electronic apparatus rises.

The fan speed controlling method of the invention includes: detecting an input voltage, an output current, and a working temperature of the electronic apparatus; calculating a target speed of the fan according to the input voltage, the output current, and the working temperature; providing a speed control signal indicating the target speed to drive the fan and obtaining a fan speed signal indicating an actual speed of the fan; and performing a close-loop control based on the fan speed signal, so that the actual speed is adjusted to the target speed.

In an embodiment of the invention, the fan speed controlling method further includes: setting a minimum speed predetermined value, a maximum voltage predetermined value, a minimum current predetermined value, a minimum temperature predetermined value, a first weight coefficient, a second weight coefficient, and a third weight coefficient.

In an embodiment of the invention, the step of calculating the target speed of the fan includes: calculating a voltage variable according to a relationship between the maximum voltage predetermined value and the input voltage; calculating a current variable according to a relationship between the minimum current predetermined value and the output current; calculating a temperature variable according to a relationship between the minimum temperature predetermined value and the working temperature; performing weight calculation on the voltage variable, the temperature variable, and the current variable with the first weight coefficient, the second weight coefficient, and the third weight coefficient respectively; and calculating the target speed based on the minimum speed predetermined value and the weighted voltage variable, the weighted current variable, and the weighted temperature variable.

In an embodiment of the invention, the voltage variable, the current variable, and the temperature variable are calculated respectively according to the following equations: $VP=Vmax-Vin$; $IP=Iout-Imin$; and $TP=T-Tmin$. $VP$, $IP$, and $TP$ respectively represent the voltage variable, the current variable, and the temperature variable; $Vmax$ represents the maximum voltage predetermined value; $Vin$ represents the input voltage; $Imin$ represents the minimum current predetermined value; $Iout$ represents the output current; $Tmin$ represents the minimum temperature predetermined value; and $T$ represents the working temperature.

In an embodiment of the invention, the target speed is calculated according to the following equation: $\omega t=\omega t\_min+\alpha \times VP+\beta \times TP+\gamma \times IP$, where $\omega t$ represents the target speed, $\omega t\_min$ represents the minimum speed predetermined value, $\alpha$ represents the first weight coefficient, $\beta$ represents the second weight coefficient, and $\gamma$ represents the third weight coefficient.

In an embodiment of the invention, $\alpha<\beta<\gamma$.

In an embodiment of the invention, the fan speed controlling method further includes: setting a maximum voltage predetermined value, a maximum current predetermined value, and a maximum temperature predetermined value.

In an embodiment of the invention, the step of calculating the target speed of the fan further includes: calculating the voltage variable further based on a relationship between the minimum voltage predetermined value and the input voltage; calculating the current variable further based on a relationship between the maximum current predetermined value and the output current; and calculating the temperature variable further based on a relationship between the maximum temperature predetermined value and the working temperature.

In an embodiment of the invention, the step of calculating the voltage variable includes: determining whether the input voltage is greater than the maximum voltage predetermined value; setting the voltage variable equal to 0 if the input voltage is greater than the maximum voltage predetermined value; determining whether the input voltage is less than the minimum voltage predetermined value; and setting the voltage variable equal to a difference between the maximum voltage predetermined value and the minimum voltage predetermined value if the input voltage is less than the minimum voltage predetermined value.

In an embodiment of the invention, the step of calculating the current variable includes: determining whether the output current is greater than the maximum current predetermined value; setting the current variable equal to a difference between the maximum current predetermined value and the minimum current predetermined value if the output current is greater than the maximum current predetermined value; determining whether the output current is less than the minimum current predetermined value; and setting the current variable equal to 0 if the output current is less than the minimum current predetermined value.

In an embodiment of the invention, the step of calculating the temperature variable includes: determining whether the working temperature is greater than the maximum temperature predetermined value; setting the temperature variable equal to a difference between the maximum temperature predetermined value and the minimum temperature predetermined value if the working temperature is greater than the maximum temperature predetermined value; determining whether the working temperature is less than the minimum temperature predetermined value; and setting the temperature variable equal to 0 if the working temperature is less than the minimum temperature predetermined value.

In an embodiment of the invention, the speed control signal is a pulse width modulation (PWM) signal, and the step of performing the close-loop control according to the fan speed signal includes: comparing the target speed and the actual speed; decreasing a duty cycle of the speed control signal to reduce the actual speed if the target speed is less than the actual speed; and increasing the duty cycle of the speed control signal to raise the actual speed if the target speed is greater than the actual speed.

The invention provides an electronic apparatus, including a fan, a power supply, and a microcontroller. The power supply is configured to provide an output current according to an input voltage. The microcontroller is configured to control an operation of the fan and the power supply. The microcontroller is configured for: detecting the input voltage, the output current, and a working temperature related to the electronic apparatus; calculate a target speed of the fan according to the input voltage, the output current, and the working temperature; providing a speed control signal indicating the target speed to drive the fan and thus obtaining a fan speed signal indicating an actual speed of the fan; and performing a close-loop control according to the fan speed signal to adjust the actual speed to the target speed.

Based on the above, the embodiments of the invention provide the fan speed controlling method and the electronic apparatus using the fan speed controlling method. The fan speed controlling method is adapted for accurately calculating the fan speed required for maintaining a specific working temperature according to variables, such as the input voltage and the output current of the power supply and the working temperature of the electronic apparatus, and performing the close-loop control accordingly, so as to stably maintain the actual speed of the fan at the target speed to improve heat dissipation efficiency of the electronic apparatus.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
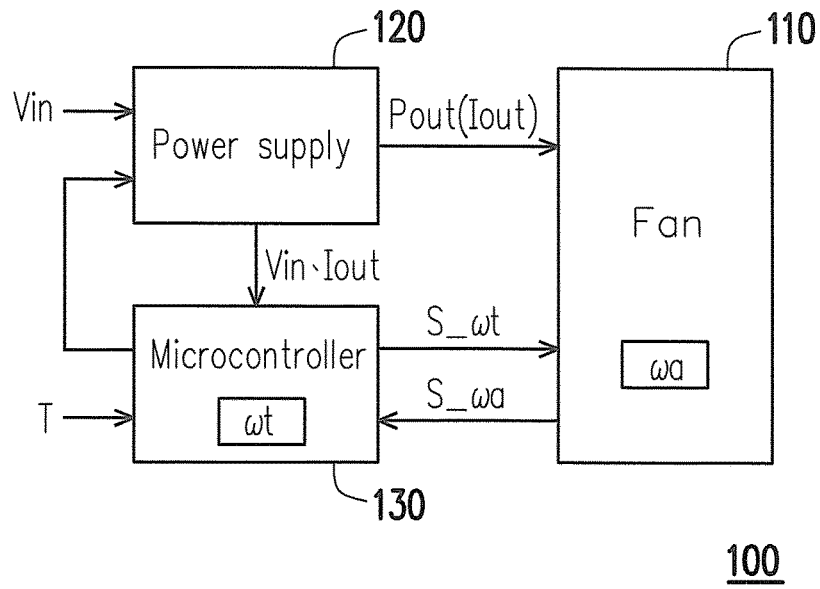
FIG. 1 is a schematic diagram illustrating an electronic apparatus according to an embodiment of the invention.

An embodiment of the invention provides a fan speed controlling method for controlling a fan speed of an electronic apparatus and the electronic apparatus using the fan speed controlling method. The fan speed controlling method is adapted for accurately calculating the fan speed required for maintaining a specific working temperature according to variables, i.e. the input voltage and the output current of the power supply and the working temperature of the electronic apparatus, and performing a close-loop control accordingly, so as to stably maintain an actual speed of the fan at a target speed to improve heat dissipation efficiency of the electronic apparatus. In order to make this disclosure more comprehensible, embodiments are described below as examples of implementation of this disclosure. Moreover, elements/components/steps with the same reference numerals are used to represent the same or similar parts in the drawings and embodiments.

FIG. 1 is a schematic diagram illustrating an electronic apparatus according to an embodiment of the invention. With reference to FIG. 1, the fan speed controlling method of the embodiment of the invention is adapted for an electronic apparatus 100 having a configuration as shown in FIG. 1. The electronic apparatus 100 includes a fan 110, a power supply 120, and a microcontroller 130. The electronic apparatus 100 may be any type of electronic apparatus equipped with a fan for heat dissipation, such as a tablet PC, a pocket PC, a personal computer, a laptop computer, a personal digital assistant (PDA), a smart phone, a power supply device, an inverter, and a micro inverter, for example. However, it should be noted that the invention is not limited to the foregoing.

More specifically, the power supply 120 provides an output power Pout (i.e. output voltage and output current Iout) to other devices/circuits/components in the electronic apparatus 100 according to an input voltage Vin. In an exemplary embodiment, the input voltage Vin is an AC voltage, and the power supply 120 is implemented by a configuration including an input conversion stage (not shown) and a power conversion circuit (not shown). The input conversion stage may be configured to receive the input voltage Vin in an AC form (e.g. AC mains (city) power, but not limited thereto) and convert the input voltage Vin to a DC voltage. The power conversion circuit may be configured to perform boost/buck conversion according to the converted input voltage Vin, so as to provide the output power Pout to the other devices/circuits/components in the electronic apparatus 100. Here, the power conversion circuit may be implemented by using any circuit topology form, such as a forward power conversion circuit, a flyback power conversion circuit, an active clamp and half bridge power conversion circuit, an active clamp and full bridge power conversion circuit, and a push-pull power conversion circuit. However, the invention is not limited to the foregoing. In other words, the invention is not intended to limit the specific configuration of the power supply 120, which may be any power supply that generates the output power Pout based on the input voltage Vin for use of other circuits.

The microcontroller 130 is configured to control an operation of the fan 110 and the power supply 120. More specifically, in this embodiment, the microcontroller 130 sets a target speed $\omega t$ according to a working state of the power supply 120 and dynamically adjusts the speed of the fan 110 by using a close-loop control mechanism, such that an actual speed $\omega a$ of the fan 110 is maintained approximately at the target speed $\omega t$ determined by the microcontroller 130 for the fan 110 to dissipate heat of the electronic apparatus 100 with favorable efficiency.

Figure 2:
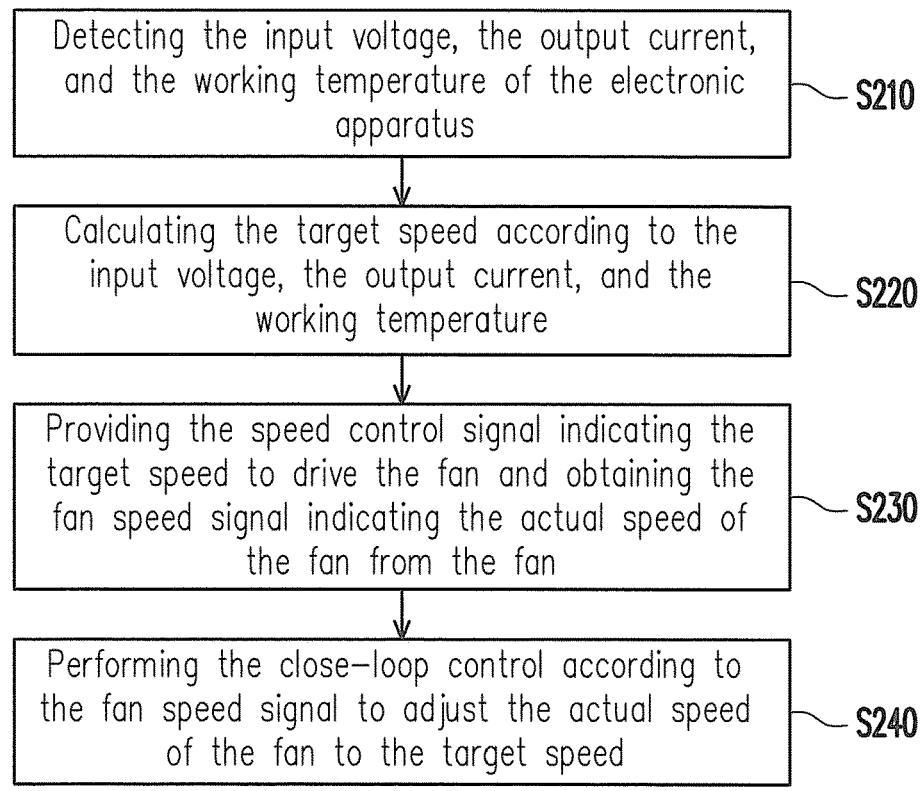
FIG. 2 is a flowchart illustrating steps of a fan speed controlling method according to an embodiment of the invention.

Details of the fan speed controlling method of the embodiment of the invention are explained with reference to the flowchart of FIG. 2. FIG. 2 is a flowchart illustrating steps of the fan speed controlling method according to an embodiment of the invention.

With reference to FIG. 1 and FIG. 2, according to the fan speed controlling method of the embodiment of the invention, the microcontroller 130 first detects the input voltage Vin, the output current Iout, and the working temperature T of the electronic apparatus 100 (Step S210), wherein the input voltage Vin and the output current Iout are respectively obtained from an input end and an output end of the power supply 120, and the working temperature T is obtained from a temperature sensor disposed in the electronic apparatus 100. The mentioned temperature sensor is configured to sense an ambient temperature in the electronic apparatus 100 as the working temperature T, or sense a temperature of a heat sink in the electronic apparatus 100 as the working temperature T. However, it should be noted that the invention is not limited thereto.

After detecting the state parameters, i.e. the input voltage Vin, the output current Iout, and the working temperature T, the microcontroller 130 calculates the target speed $\omega t$ according to the input voltage Vin, the output current Iout, and the working temperature T detected (Step S220). Basically, a contribution associated with the input voltage Vin for calculating the target speed $\omega t$ has a negative correlation with the input voltage Vin; and contributions associated with the output current Iout and the working temperature T for calculating the target speed $\omega t$ have a positive correlation with the output current Iout and the working temperature T respectively. In other words, while the output current Iout and the working temperature T remain unchanged, the target speed $\omega t$ calculated by the microcontroller 130 increases with the decrease of the input voltage Vin detected by the microcontroller 130. Moreover, while the input voltage Vin and the working temperature T/the output current Iout remain unchanged, the target speed $\omega t$ calculated by the microcontroller 130 increases with the increase of the output current Iout/the working temperature T detected by the microcontroller 130 (However, it should be noted that the aforementioned relations are not necessarily established in a specific working state in some exemplary embodiments, details of which will be provided in the following embodiments).

Then, the microcontroller 130 provides a speed control signal $S\_\omega t$ indicating the target speed $\omega t$ according to the calculated target speed $\omega t$ to drive the fan 110, and obtains a fan speed signal $S\_\omega a$ indicating the actual speed $\omega a$ of the fan 110 from the fan 110 (Step S230).

After obtaining the fan speed signal $S\_\omega a$ indicating the actual speed $\omega a$ of the fan 110, the microcontroller 130 performs a close-loop control according to the fan speed signal $S\_\omega a$ to gradually adjust the actual speed of the fan 110 to the target speed set by the microcontroller 130 (Step S240).

More specifically, due to change of the working state, e.g. decrease of the input voltage Vin (indicating increase of an input current) or increase of the output current Iout, the temperature of the electronic apparatus 100 rises. Regarding the temperature change caused by change of the working state, according to the conventional controlling method that adjusts the fan speed only based on the working temperature, the fan speed is adjusted only when the change of the working state has caused change of the working temperature.

In contrast thereto, the fan speed controlling method of the embodiment of the invention not only uses the working temperature T as the basis for setting the fan speed but also predicts whether the current working state of the electronic apparatus 100 would cause rise of the temperature based on the working state of the power supply 120, so as to timely adjust the fan speed for heat dissipation. Therefore, the fan speed controlling method of the embodiment of the invention increases the fan speed before the temperature of the electronic apparatus 100 rises and achieves favorable efficiency in heat dissipation.

Furthermore, in comparison with the conventional control mechanism that uses a voltage signal or a pulse width modulation signal to perform close-loop control (i.e. the speed control signal is adjusted to a specific voltage value or duty cycle according to the fan speed signal sent back by the fan), in the embodiment of the invention, the target speed to be set is directly calculated and the speed control signal is adjusted for adjusting the actual speed of the fan to the set target speed. Therefore, the embodiment of the invention effectively improves errors in the fan speed that occur due to different fan specifications and/or wear of the fan with the same speed control signal.

Figure 3:
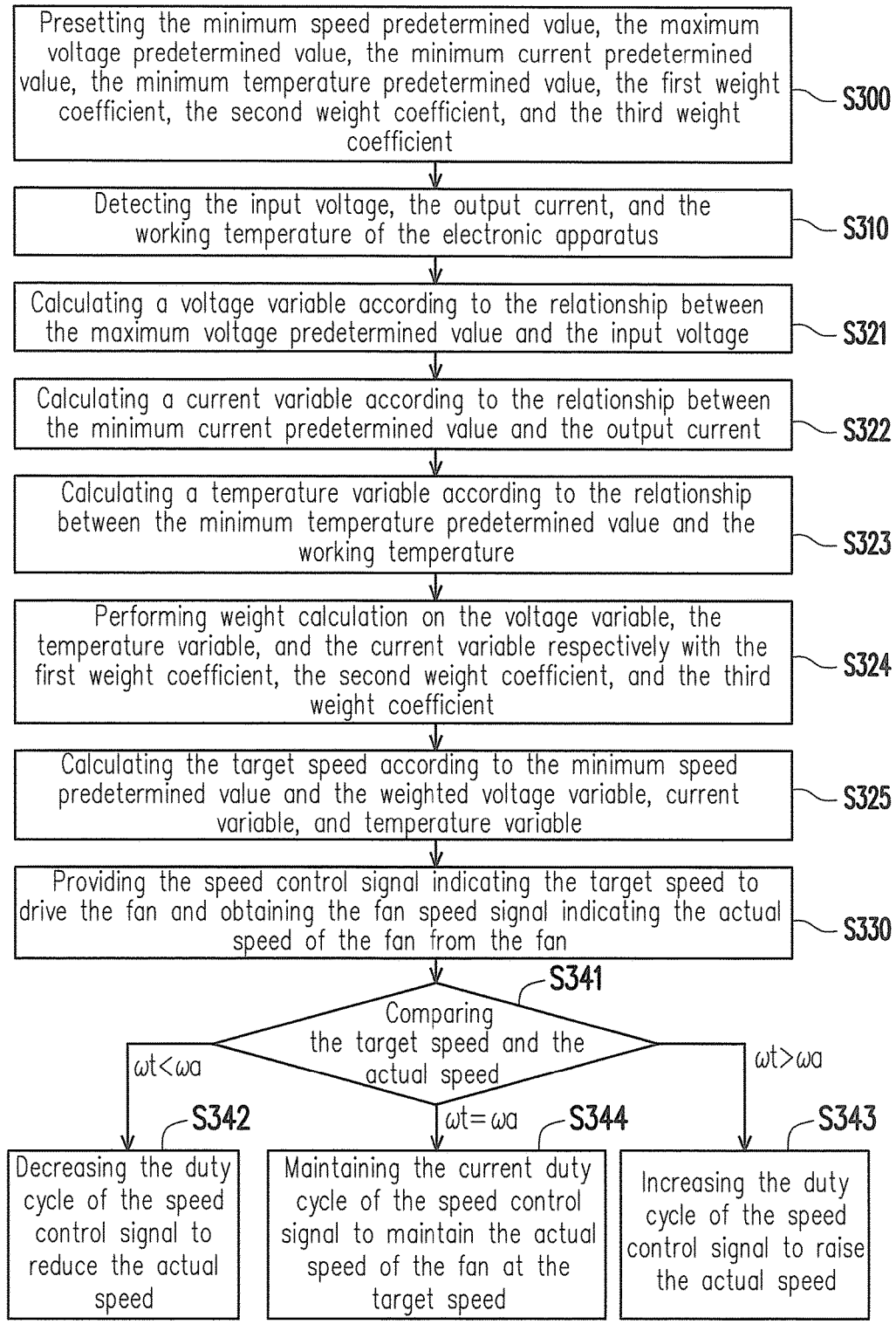
FIG. 3 is a flowchart illustrating steps of the fan speed controlling method according to another embodiment of the invention.

Below steps of the fan speed controlling method of the embodiment of the invention are described with reference to FIG. 3. FIG. 3 is a flowchart illustrating the steps of the fan speed controlling method according to another embodiment of the invention.

With reference to FIG. 1 and FIG. 3, first, the designer presets a minimum speed predetermined value, a maximum voltage predetermined value, a minimum current predetermined value, a minimum temperature predetermined value, a first weight coefficient, a second weight coefficient, and a third weight coefficient according to a heat dissipation requirement of the electronic apparatus (Step S300). When the electronic apparatus 100 starts operating, similar to the embodiment of FIG. 2, the microcontroller 130 detects the input voltage Vin, the output current Iout, and the working temperature T of the electronic apparatus 100 (Step S310).

Next, the microcontroller 130 calculates a voltage variable according to a relationship between the preset maximum voltage predetermined value and the input voltage Vin (Step S321); calculates a current variable according to a relationship between the preset minimum current predetermined value and the output current Iout (Step S322); and calculates a temperature variable according to a relationship between the preset minimum temperature predetermined value and the working temperature T (Step S323). The aforementioned Steps S321-S323 may be executed simultaneously or sequentially, and a sequence of executing these steps may be determined according to the requirements of design and thus should not be construed to limit the invention.

To be more specific, in Steps S321-S323, the voltage variable, the current variable, and the temperature variable are calculated according to the following equations:

$$VP = V\text{max} - V\text{in} \quad (1)$$

$$IP = I\text{out} - I\text{min} \quad (2)$$

$$TP = T - T\text{min} \quad (3)$$

In the above equations (1)-(3), VP, IP, and TP respectively represent the voltage variable, the current variable, and the temperature variable. Vmax, Imin, and Tmin respectively represent the maximum voltage predetermined value, the minimum current predetermined value, and the minimum temperature predetermined value that are preset in Step S300. Vin, Iout, and T respectively represent the input voltage, the output current, and the working temperature of the electronic apparatus 100.

After calculating the voltage variable VP, the current variable IP, and the temperature variable TP, the microcontroller 130 performs weight calculation on the voltage variable, the temperature variable, and the current variable respectively with the first weight coefficient, the second weight coefficient, and the third weight coefficient preset in Step S300 (Step S324), and then calculates the target speed ωt according to the minimum speed predetermined value preset in Step S300 and the weighted voltage variable VP, current variable IP, and temperature variable TP (Step S325).

More specifically, in Steps S324-S325, the target speed ωt is calculated according to the following equation:

$$\omega t = \omega t\_\text{min} + \alpha \times VP + \beta \times TP + \gamma \times IP \quad (4)$$

In Equation (4), ωt represents the target speed, ωt_min represents the minimum speed predetermined value, α represents the first weight coefficient, β represents the second weight coefficient, and γ represents the third weight coefficient. The weighted voltage variable VP, temperature variable TP, and current variable IP are (α×VP+β×TP+γ×IP).

Furthermore, based on Steps S321-S325 of calculating the target speed ωt, it is known that the target speed ωt increases as the voltage variable VP, the current variable IP, or the temperature variable TP increases. That is to say, the target speed ωt increases when the input voltage Vin decreases, the output current Iout increases, or the working temperature T increases. Moreover, in this embodiment, a lower limit of the voltage variable VP, the current variable IP, and the temperature variable TP calculated in Steps S321-S323 is 0. That is, a lower limit of the target speed ωt is the minimum speed predetermined value ωt_min.

Also, it should be noted that the first weight coefficient α, the second weight coefficient β, and the third weight coefficient γ described above may be set according to the influence of temperature on the electronic apparatus 100. In an exemplary embodiment, α<β<γ. Nevertheless, the invention is not limited thereto.

After calculating the target speed ωt, the microcontroller 130 provides the speed control signal S_ωt according to the target speed ωt to drive the fan 110, and performs the close-loop control according to the fan speed signal S_ωa sent back from the fan 110 (Step S330). Here, the speed control signal S_ωt is a pulse width modulation (PWM) signal, for example. That is, in this embodiment, the fan speed is adjusted by adjusting the duty cycle of the speed control signal S_ωt. However, it should be noted that the invention is not limited thereto.

In the process of performing the close-loop control, the microcontroller 130 obtains the actual speed ωa of the fan 110 according to the fan speed signal S_ωa received from the fan 110, compares the target speed ωt and the actual speed ωa to obtain a difference therebetween (Step S341), and performs different adjustments of the duty cycle according to the comparison result. Specifically, if the microcontroller 130 determines that the target speed ωt is less than the actual speed ωa, the duty cycle of the speed control signal S_ωt is decreased to reduce the actual speed ωa (Step S342); and if the microcontroller 130 determines that the target speed ωt is greater than the actual speed ωa, the duty cycle of the speed control signal S_ωt is increased to raise the actual speed ωa (Step S343). In addition, if the microcontroller 130 determines that the target speed ωt is equal to the actual speed ωa, the current duty cycle of the speed control signal S_ωt is maintained, so as to maintain the actual speed ωa of the fan 110 at the target speed ωt (Step S344).

Further to the aforementioned steps, in order to restrict the calculated target speed ωt within a reasonable speed range, in another exemplary embodiment, the designer further presets a maximum voltage predetermined value, a maximum current predetermined value, and a maximum temperature predetermined value in Step S300, such that Step S321 of calculating the voltage variable VP is performed also based on a relationship between the minimum voltage predetermined value and the input voltage Vin, Step S322 of calculating the current variable IP is performed also based on a relationship between the maximum current predetermined value and the output current Iout, and Step S323 of calculating the temperature variable TP is performed also based on a relationship between the maximum temperature predetermined value and the working temperature T.

Below exemplary embodiments of the steps of calculating the voltage variable (Step S321), calculating the current variable (Step S322), and calculating the temperature variable (Step S323) are described with reference to FIG. 4A to FIG. 4C respectively.

Figure 4A:
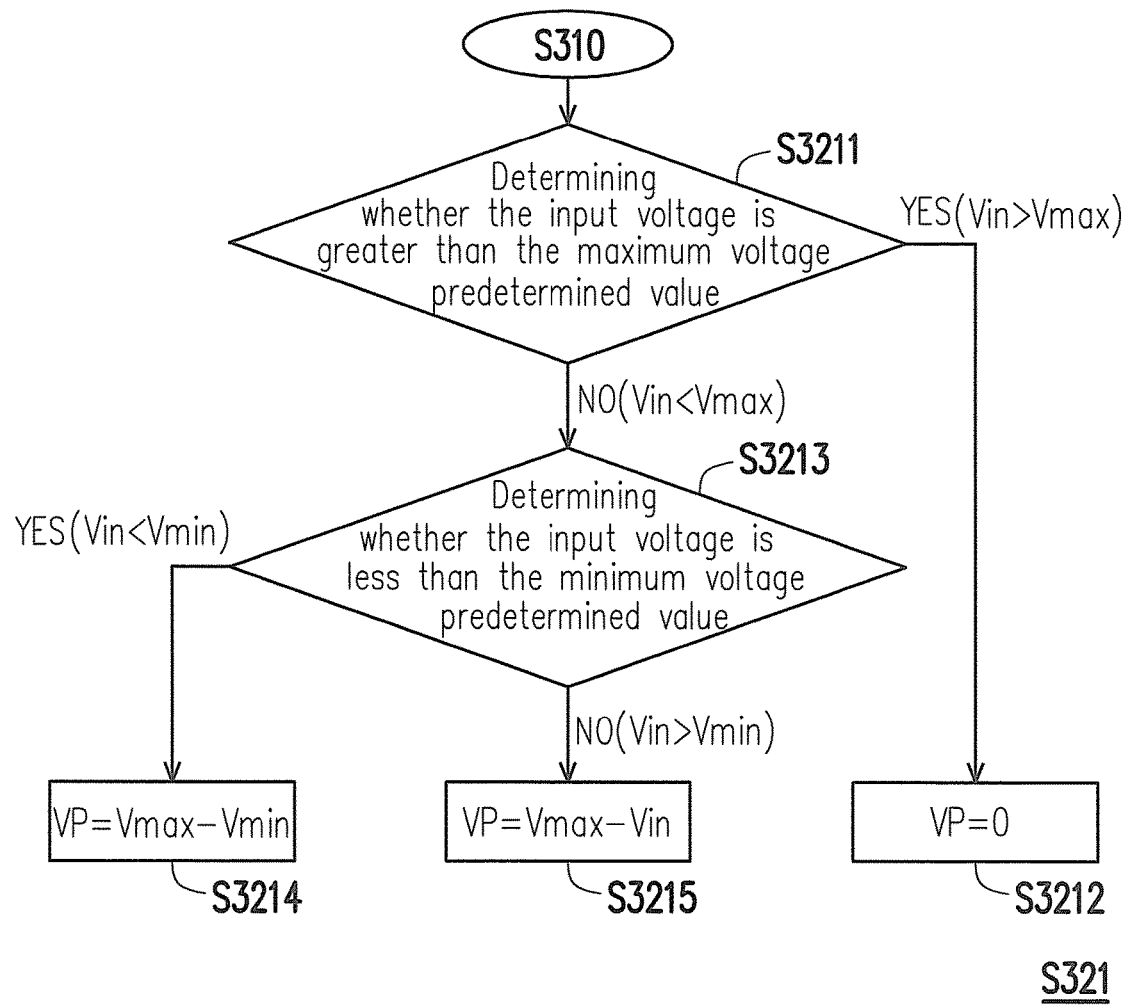
FIG. 4A is a flowchart illustrating steps of calculating a voltage variable according to the embodiment of FIG. 3.

With reference to FIG. 1 and FIG. 4A, FIG. 4A is a flowchart illustrating steps of calculating the voltage variable according to the embodiment of FIG. 3. In the step of calculating the voltage variable VP (Step S321) in this embodiment, first, the microcontroller 130 determines whether the input voltage Vin is greater than the maximum voltage predetermined value Vmax (Step S3211). If the result is YES (i.e. Vin>Vmax), the voltage variable VP is set equal to 0 (Step S3212). That is, the microcontroller 130 calculates the voltage variable VP based on that the input voltage Vin is equal to the maximum voltage predetermined value Vmax. Thus, VP=Vmax−Vmax=0.

On the other hand, if the result of Step S3211 is NO (i.e. Vin<Vmax), the microcontroller 130 further determines whether the input voltage Vin is less than the minimum voltage predetermined value Vmin (Step S3213). In Step S3213, if the result is YES (i.e. Vin<Vmin), the voltage variable VP is set equal to a difference between the maximum voltage predetermined value Vmax and the minimum voltage predetermined value Vmin (Step S3214). That is, the microcontroller 130 calculates the voltage variable VP based on that the input voltage Vin is equal to the minimum voltage predetermined value Vmin. Thus, VP=Vmax−Vmin.

On the contrary, if the input voltage Vin is in a range between the minimum voltage predetermined value Vmin and the maximum voltage predetermined value Vmax (i.e. Vmin≤Vin≤Vmax), the voltage variable VP is calculated using the input voltage Vin that is actually detected (Step S3215).

Figure 4B:
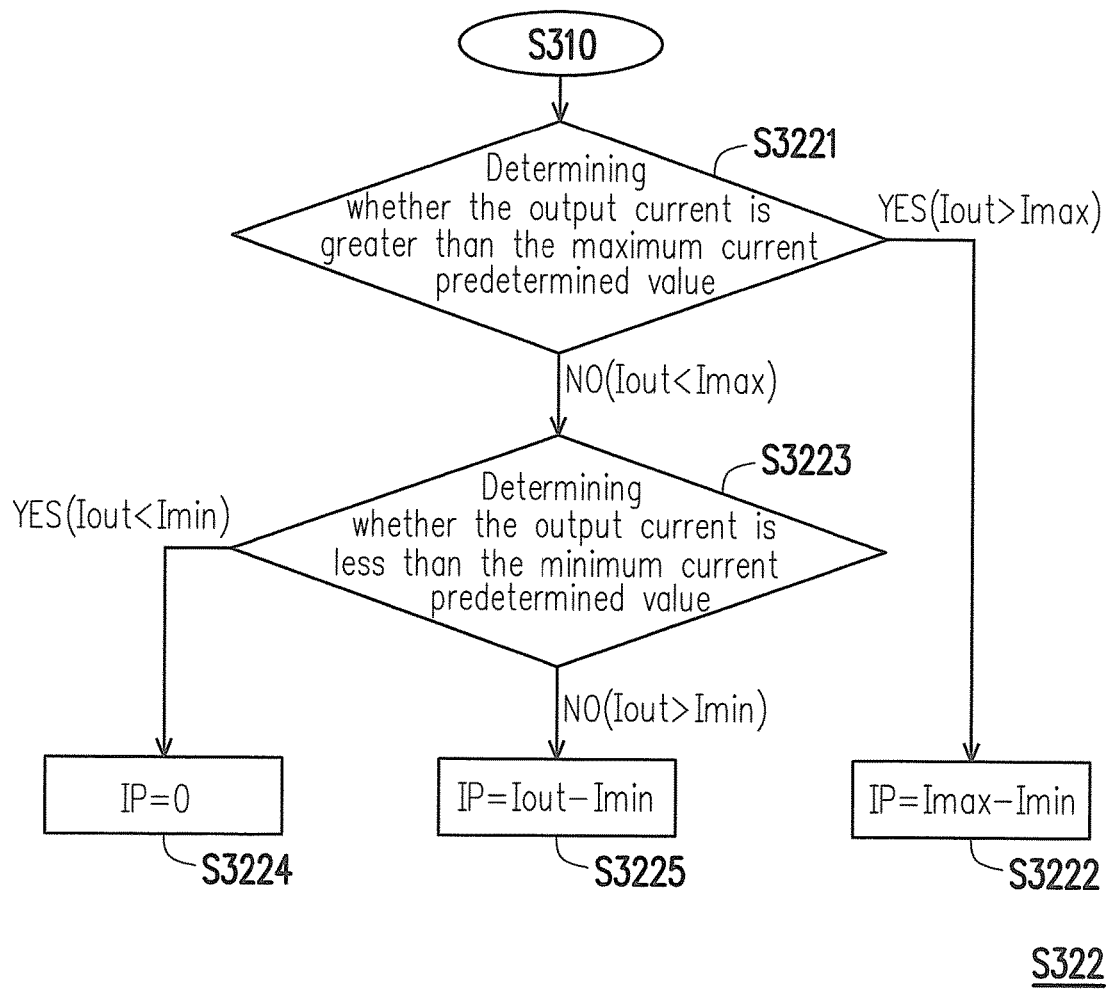
FIG. 4B is a flowchart illustrating steps of calculating a current variable according to the embodiment of FIG. 3.

With reference to FIG. 1 and FIG. 4B, FIG. 4B is a flowchart illustrating steps of calculating the current variable according to the embodiment of FIG. 3. In the step of calculating the current variable IP (Step S322) in this embodiment, first, the microcontroller 130 determines whether the output current Iout is greater than the maximum current predetermined value Imax (Step S3221). If the result is YES (i.e. Iout>Imax), the current variable IP is set equal to a difference between the maximum current predetermined value Imax and the minimum current predetermined value Imin (Step S3222). That is, the microcontroller 130 calculates the current variable IP based on that the output current Iout is equal to the maximum current predetermined value Imax. Thus, IP=Imax−Imin.

On the other hand, if the result of Step S3221 is NO (i.e. Iout<Imax), the microcontroller 130 further determines whether the output current Iout is less than the minimum current predetermined value Imin (Step S3223). In Step S3223, if the result is YES (i.e. Iout<Imin), the current variable IP is set equal to 0 (Step S3224). That is, the microcontroller 130 calculates the current variable IP based on that the output current Iout is equal to the minimum current predetermined value Imin. Thus, IP=Imin−Imin=0.

On the contrary, if the output current Iout is in a range between the minimum current predetermined value Imin and the maximum current predetermined value Imax (i.e. Imin≤Iout≤Imax), the current variable IP is calculated using the output current Iout that is actually detected (Step S3225).

Figure 4C:
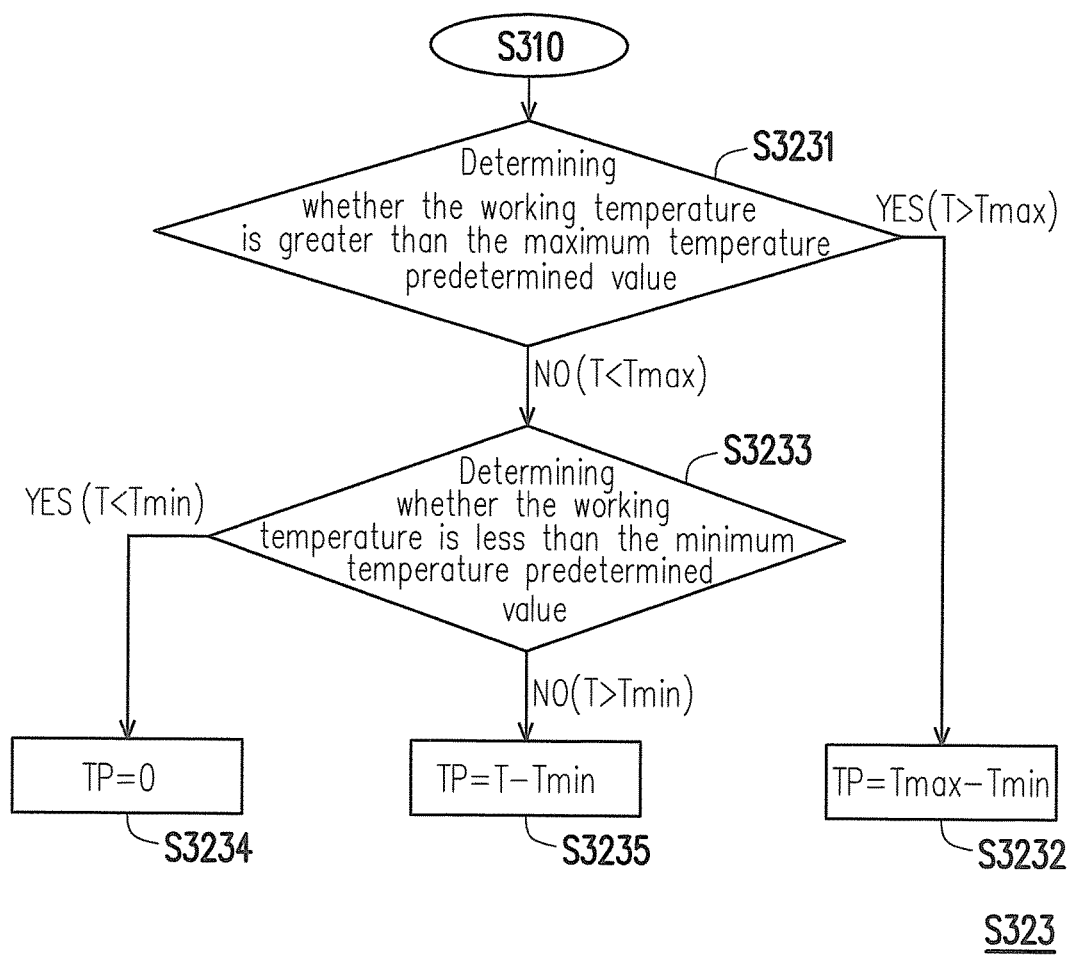
FIG. 4C is a flowchart illustrating steps of calculating a temperature variable according to the embodiment of FIG. 3.

With reference to FIG. 1 and FIG. 4C, FIG. 4C is a flowchart illustrating steps of calculating the temperature variable according to the embodiment of FIG. 3. In the step of calculating the temperature variable TP (Step S323) in this embodiment, first, the microcontroller 130 determines whether the working temperature T is greater than the maximum temperature predetermined value Tmax (Step S3231). If the result is YES (i.e. T>Tmax), the temperature variable TP is set equal to a difference between the maximum temperature predetermined value Tmax and the minimum temperature predetermined value Tmin (Step S3232). That is, the microcontroller 130 calculates the temperature variable TP based on that the working temperature T is equal to the maximum temperature predetermined value Tmax. Thus, TP=Tmax−Tmin.

On the other hand, if the result of Step S3231 is NO (i.e. T<Tmax), the microcontroller 130 further determines whether the working temperature T is less than the minimum temperature predetermined value Tmin (Step S3233). In Step S3233, if the result is YES (i.e. T<Tmin), the temperature variable TP is set equal to 0 (Step S3234). That is, the microcontroller 130 calculates the temperature variable TP based on that the working temperature T is equal to the minimum temperature predetermined value Tmin. Thus, TP=Tmin−Tmin=0.

On the contrary, if the working temperature T is in a range between the minimum temperature predetermined value Tmin and the maximum temperature predetermined value Tmax (i.e. Tmin≤T≤Tmax), the temperature variable TP is calculated using the working temperature T that is actually detected (Step S3235).

By performing the steps of FIG. 4A to FIG. 4C, the variables VP, IP, and TP for generating the target speed ωt are respectively restricted within a specific range (which may be varied and decided by the designer), so as to prevent the electronic apparatus 100 from increasing the fan speed with no limit in the case of an extreme operation condition (e.g. a significant increase of the output current Iout due to short circuit) and damaging the circuit.

To sum up, the embodiments of the invention provide the fan speed controlling method and the electronic apparatus using the fan speed controlling method. The fan speed controlling method is adapted for accurately calculating the fan speed required for maintaining a specific working temperature according to the variables, i.e. the input voltage and the output current of the power supply and the working temperature of the electronic apparatus, and performing the close-loop control accordingly, so as to stably maintain the actual speed of the fan at the target speed to improve heat dissipation efficiency of the electronic apparatus. In addition, since the fan speed directly serves as the basis of control according to the fan speed controlling method, when the same speed control signal is applied, errors in the fan speed resulting from different fan specifications and/or wear of the fan are avoided. Thus, the fan can effectively dissipate the heat generated by the internal parts (e.g. CPU) and/or devices and circuits (e.g. power supply) in the electronic apparatus to the outside of the housing of the electronic apparatus for the electronic apparatus to function normally.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A fan speed controlling method for controlling a speed of a fan of an electronic apparatus, the fan speed controlling method comprising:
providing an output power to at least one component of the electronic apparatus;
detecting an input voltage and an output current of the output power, and a working temperature of the electronic apparatus;
calculating a target speed of the fan according to a difference between a maximum voltage predetermined value and the input voltage, a difference between a minimum current predetermined value and the output current, and a difference between a minimum temperature predetermined value and the working temperature;
providing a speed control signal indicating the target speed to drive the fan and obtaining a fan speed signal indicating an actual speed of the fan; and
performing a close-loop control according to the fan speed signal to adjust the actual speed to the target speed.

2. The fan speed controlling method according to claim 1, further comprising:

setting a minimum speed predetermined value, the maximum voltage predetermined value, the minimum current predetermined value, the minimum temperature predetermined value, a first weight coefficient, a second weight coefficient, and a third weight coefficient.

3. The fan speed controlling method according to claim 2, wherein the step of calculating the target speed of the fan comprises:
calculating a voltage variable according to a relationship between the maximum voltage predetermined value and the input voltage;
calculating a current variable according to a relationship between the minimum current predetermined value and the output current;
calculating a temperature variable according to a relationship between the minimum temperature predetermined value and the working temperature;
performing weight calculation on the voltage variable, the temperature variable, and the current variable with the first weight coefficient, the second weight coefficient, and the third weight coefficient respectively; and
calculating the target speed based on the minimum speed predetermined value and a weighted voltage variable, a weighted current variable, and a weighted temperature variable.

4. The fan speed controlling method according to claim 3, wherein the voltage variable, the current variable, and the temperature variable are calculated respectively according to the following equations:

$$VP=V\text{max}-V\text{in};$$

$$IP=I\text{out}-I\text{min}; \text{ and}$$

$$TP=T-T\text{min},$$

wherein VP, IP, and TP respectively represent the voltage variable, the current variable, and the temperature variable; Vmax represents the maximum voltage predetermined value; Vin represents the input voltage; Imin represents the minimum current predetermined value; Iout represents the output current; Tmin represents the minimum temperature predetermined value; and T represents the working temperature.

5. The fan speed controlling method according to claim 4, wherein the target speed is calculated according to the following equation:

$$\omega t=\omega t\_\text{min}+\alpha \times VP+\beta \times TP+\gamma \times IP,$$

wherein ωt represents the target speed, ωt_min represents the minimum speed predetermined value, α represents the first weight coefficient, β represents the second weight coefficient, and γ represents the third weight coefficient.

6. The fan speed controlling method according to claim 5, wherein $\alpha<\beta<\gamma$.

7. The fan speed controlling method according to claim 2, further comprising:
setting a minimum voltage predetermined value, a maximum current predetermined value, and a maximum temperature predetermined value.

8. The fan speed controlling method according to claim 7, wherein the step of calculating the target speed of the fan comprises:
calculating a voltage variable based on a relationship between the maximum voltage predetermined value and the input voltage and a relationship between the minimum voltage predetermined value and the input voltage, wherein the maximum voltage predetermined value is greater than the minimum voltage predetermined value;
calculating a current variable further based on a relationship between the minimum current predetermined value and the output current and a relationship between the maximum current predetermined value and the output current, wherein the maximum current predetermined value is greater than the minimum current predetermined value;
calculating the temperature variable based on a relationship between the minimum temperature predetermined value and the working temperature and a relationship between the maximum temperature predetermined value and the working temperature, wherein the maximum temperature predetermined value is greater than the minimum temperature predetermined value;
performing weight calculation on the voltage variable, the temperature variable, and the current variable with the first weight coefficient, the second weight coefficient, and the third weight coefficient respectively; and
calculating the target speed based on the minimum speed predetermined value and a weighted voltage variable, a weighted current variable, and a weighted temperature variable.

9. The fan speed controlling method according to claim 8, wherein the step of calculating the voltage variable comprises:
determining whether the input voltage is greater than the maximum voltage predetermined value;
setting the voltage variable equal to 0 if the input voltage is greater than the maximum voltage predetermined value;
determining whether the input voltage is less than the minimum voltage predetermined value; and
setting the voltage variable equal to a difference between the maximum voltage predetermined value and the minimum voltage predetermined value if the input voltage is less than the minimum voltage predetermined value.

10. The fan speed controlling method according to claim 8, wherein the step of calculating the current variable comprises:
determining whether the output current is greater than the maximum current predetermined value;
setting the current variable equal to a difference between the maximum current predetermined value and the minimum current predetermined value if the output current is greater than the maximum current predetermined value;
determining whether the output current is less than the minimum current predetermined value; and
setting the current variable equal to 0 if the output current is less than the minimum current predetermined value.

11. The fan speed controlling method according to claim 8, wherein the step of calculating the temperature variable comprises:
determining whether the working temperature is greater than the maximum temperature predetermined value;
setting the temperature variable equal to a difference between the maximum temperature predetermined value and the minimum temperature predetermined value if the working temperature is greater than the maximum temperature predetermined value;
determining whether the working temperature is less than the minimum temperature predetermined value; and setting the temperature variable equal to 0 if the working temperature is less than the minimum temperature predetermined value.

12. The fan speed controlling method according to claim 1, wherein the speed control signal is a pulse width modulation (PWM) signal, and the step of performing the close-loop control according to the fan speed signal comprises:
   comparing the target speed and the actual speed;
   decreasing a duty cycle of the speed control signal to reduce the actual speed if the target speed is less than the actual speed; and
   increasing the duty cycle of the speed control signal to raise the actual speed if the target speed is greater than the actual speed.

13. An electronic apparatus, comprising:
   a fan;
   a power supply configured to provide an output current according to an input voltage to at least one component of the electronic apparatus; and
   a microcontroller configured to control an operation of the fan and the power supply, and configured to:
   detect the input voltage, the output current, and a working temperature related to the electronic apparatus;
   calculate a target speed of the fan according to a difference between a maximum voltage predetermined value and the input voltage, a difference between a minimum current predetermined value and the output current, and a difference between a minimum temperature predetermined value and the working temperature;
   provide a speed control signal indicating the target speed to drive the fan and obtain a fan speed signal indicating an actual speed of the fan; and
   perform a close-loop control according to the fan speed signal to adjust the actual speed to the target speed.

* * * * *